(12) United States Patent
Gordon et al.

(10) Patent No.: US 11,552,822 B2
(45) Date of Patent: Jan. 10, 2023

(54) SYSTEMS AND METHODS FOR ESTABLISHING A BACKUP SECURE COMMUNICATION LINK IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); Robert Meine, Boise, ID (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 176 days.

(21) Appl. No.: 17/210,881

(22) Filed: Mar. 24, 2021

(65) Prior Publication Data
US 2022/0311642 A1   Sep. 29, 2022

(51) Int. Cl.
| | |
|---|---|
| *H04L 29/06* | (2006.01) |
| *H04L 12/46* | (2006.01) |
| *G06F 21/60* | (2013.01) |
| *H04L 9/40* | (2022.01) |

(52) U.S. Cl.
CPC ........ *H04L 12/4633* (2013.01); *G06F 21/602* (2013.01); *H04L 12/465* (2013.01); *H04L 63/061* (2013.01); *H04L 63/08* (2013.01)

(58) Field of Classification Search
CPC . H04L 12/4633; H04L 12/465; H04L 63/061; H04L 63/08; G06F 21/602
See application file for complete search history.

(56) References Cited

U.S. PATENT DOCUMENTS

| | | | |
|---|---|---|---|
| 7,729,276 B2 | 6/2010 | Akyol | |
| 10,700,890 B1* | 6/2020 | Kalyanaraman | .... H04L 49/3027 |
| 2010/0074099 A1* | 3/2010 | Balasubramanian | ........................ H04W 24/04 370/219 |
| 2011/0004913 A1* | 1/2011 | Nagarajan | ............. H04L 63/102 726/1 |
| 2017/0171747 A1* | 6/2017 | Britt | .................. H04W 12/0431 |
| 2017/0288950 A1* | 10/2017 | Manson | .............. H04L 43/0817 |
| 2018/0302269 A1* | 10/2018 | Sankaran | .............. H04L 63/162 |
| 2019/0116183 A1 | 4/2019 | Hussain | |
| 2019/0173860 A1 | 6/2019 | Sankaran | |
| 2019/0342101 A1 | 11/2019 | Hayes | |
| 2019/0386824 A1* | 12/2019 | Havaralu Rama Chandra Adiga | ................... H04L 63/061 |

(Continued)

*Primary Examiner* — Shin-Hon (Eric) Chen
(74) *Attorney, Agent, or Firm* — Fletcher Yoder, P.C.

(57) ABSTRACT

A controller for an electric power distribution system includes processing circuitry and a memory that includes instructions. The instructions, when executed by the processing circuitry, are configured to cause the processing circuitry to determine that a first switch of the electric power distribution system is a primary switch communicatively coupled to an intelligent electronic device (IED) of the electric power distribution system, determine that a second switch of the electric power distribution system is a backup switch communicatively coupled to the TED, and distribute a first copy of a security association key (SAK) to the first switch and a second copy of the SAK to the second switch in response to determining that the first switch is the primary switch and the second switch is the backup switch to enable the first switch and the second switch to establish respective media access control security (MACsec) communication links with the IED.

7 Claims, 6 Drawing Sheets

(56) References Cited

U.S. PATENT DOCUMENTS

2020/0106719 A1    4/2020  Acharya
2020/0244518 A1*   7/2020  Adragna ............. H04L 41/0668
2021/0092597 A1*   3/2021  Sharma ............. H04W 36/0069
2021/0194724 A1*   6/2021  Lee ..................... H04J 14/0294
2021/0377160 A1*  12/2021  K ............................ H04L 41/40

* cited by examiner

SYSTEMS AND METHODS FOR ESTABLISHING A BACKUP SECURE COMMUNICATION LINK IN AN ELECTRIC POWER DISTRIBUTION SYSTEM

BACKGROUND

This disclosure relates to systems and method for establishing a secure communication link between devices of an electric power distribution system. In particular, this disclosure relates to establishing a backup secure communication link between the devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other devices of the electric power distribution system during operation of the electric power distribution system. For example, the IED may receive and/or transmit a signal and/or data in order to perform a functionality, such as to control a circuit breaker in response to electrical measurements of the electric power distribution system. Secure communication links between the IED and other devices of the electric power distribution system are used to enable the devices to securely communicate with one another. During operation, however, an established secure communication link between the IED and another device may become unavailable. As a result, the IED may not be able to communicate with the other device until another secure communication link has been established between the IED and the other device.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a controller for an electric power distribution system includes processing circuitry and a memory that includes instructions. The instructions, when executed by the processing circuitry, are configured to cause the processing circuitry to determine that a first switch of the electric power distribution system is a primary switch communicatively coupled to an intelligent electronic device (IED) of the electric power distribution system, determine that a second switch of the electric power distribution system is a backup switch communicatively coupled to the IED, and distribute a first copy of a security association key (SAK) to the first switch and a second copy of the SAK to the second switch in response to determining that the first switch is the primary switch and the second switch is the backup switch to enable the first switch and the second switch to establish respective media access control security (MACsec) communication links with the IED.

In an embodiment, an intelligent electronic device (IED) of an electric power distribution system includes processing circuitry and a memory that has instructions. The instructions, when executed by the processing circuitry, are configured to cause the processing circuitry to establish a first media access control security key agreement (MKA) connectivity association with a first switch of the electric power distribution system via a first connectivity association key (CAK), establish a second MKA connectivity association with a second switch of the electric power distribution system via a second CAK, communicate data via the first switch using a security association key (SAK), and communicate data via the second switch using the SAK instead of via the first switch using the SAK based on a determination that communication of data via the first switch is unavailable.

In an embodiment, an electric power distribution system includes a first switch configured to establish a first media access security (MACsec) communication link with an intelligent electronic device (IED), a second switch configured to establish a second MACsec communication link with the IED, and a controller configured to determine that the first switch is a primary switch and determine that the second switch is a backup switch to the first switch. In response to a determination that the first switch is the primary switch, the controller is configured to distribute a first copy of a first secure association key (SAK) to the first switch to enable the first switch to establish the first MACsec communication link as an active secure communication link with the IED In response to a determination that the second switch is the backup switch, the controller is configured to distribute a second copy of the same SAK to the second switch to enable the second switch to establish the second MACsec communication link as an inactive secure communication link with the IED.

DETAILED DESCRIPTION

Figure 1:
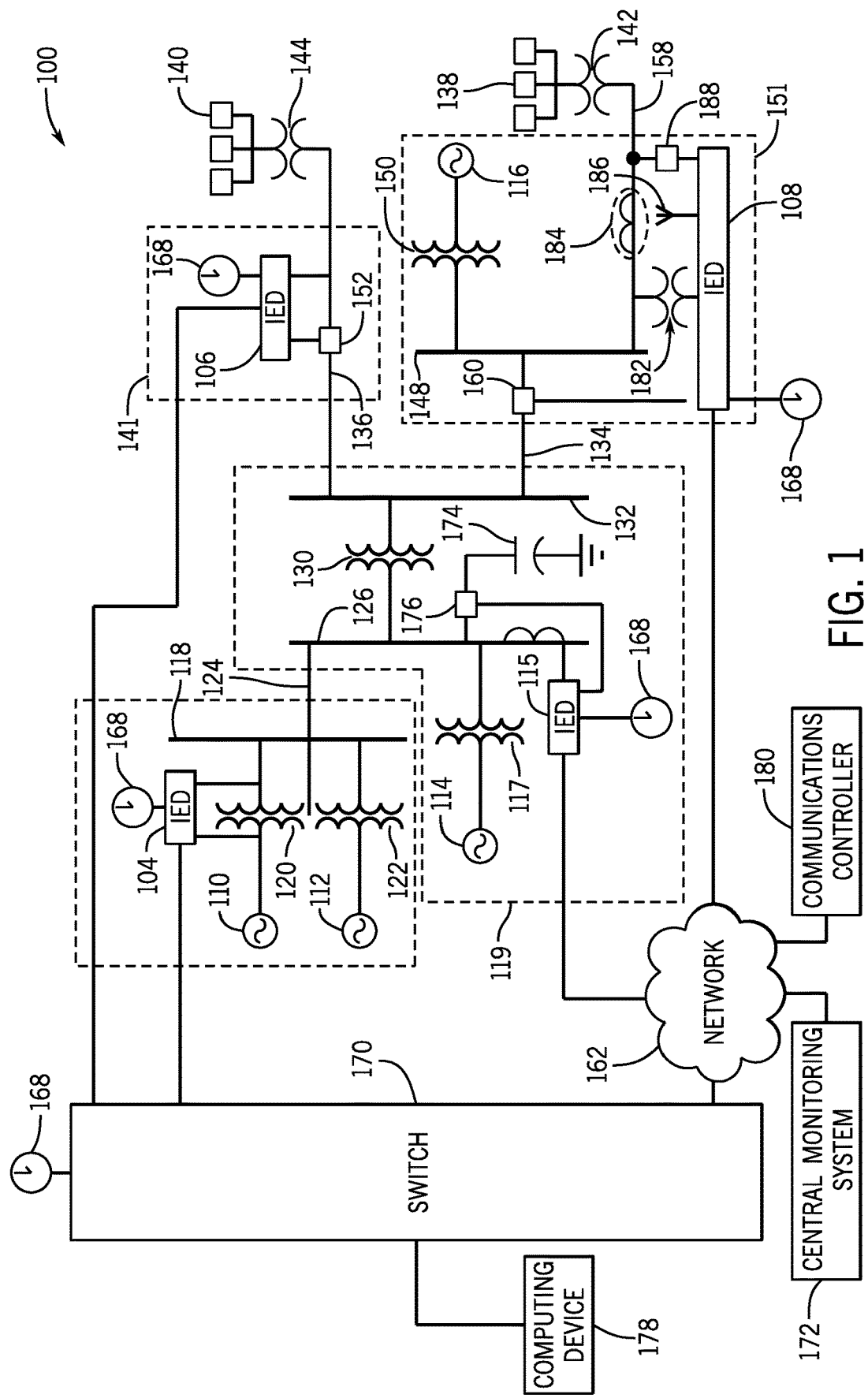
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link or channel between devices of an electric power distribution system. Intelligent electronic devices (IEDs) may be used to control certain devices and to perform certain operations of the electric power distribution system. For example, an IED may be a relay that enables or blocks electrical power flow between other devices of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power distribution system. As such, the IEDs may facilitate operation of the electric power distribution system.

In certain embodiments, the electric power distribution system may use a software-defined network (SDN) to facilitate communication between various devices of the electric power distribution system. For example, the electric power distribution system may have a switch communicatively coupled to various IEDs. The switch may receive data from a first IED and may transmit the data to a second IED in order to enable the IEDs to communicate data between one another. The electric power distribution system may also include a controller communicatively coupled to the switch. The controller may provide rules or instructions to the switch regarding how data is to be transmitted within the electric power distribution system, such as by providing a location or a destination to which the switch is to transmit certain data (e.g., data received from one of the IEDs). In this way, the controller may setup operation of the switch to transmit data. In certain embodiments, after setting up the operation of the switch, the controller may be communicatively decoupled from the switch, and the switch may continue to operate to communicate data between devices using the instructions received from the controller without having to further communicate with the controller.

In some embodiments, the switch may establish a respective media access control security (MACsec) communication link and/or a respective MACsec key agreement (MKA) connectivity association with the IEDs and/or with other devices to communicate data. To establish the MACsec communication link, an MKA protocol is initially established between the switch and the IED via an adoption link. During the MKA protocol, the switch may select a connectivity association key (CAK) from a set of keys (e.g., a set of keys generated by the switch, a set of keys received from the controller) and may distribute the CAK or a copy of the CAK to the IED via the adoption link. The switch may establish an MKA connectivity association upon verification that the IED possesses the CAK. The switch may then select a security association key (SAK) from another set of the keys (e.g., the same set of keys from where the CAK is selected, a set of keys separate from where the CAK is selected) for distribution to the IED via the MKA connectivity association. The switch may retain a copy of the same SAK, and the switch and the IED may use their respective copies of the SAK to establish a MACsec communication link for communicating with one another. For example, the switch and the IED may encrypt data using their copy of the SAK and/or may decrypt encrypted data using their copy of the SAK in order to communicate data securely between one another.

During establishment of the SDN, the controller may distribute respective copies of a key (e.g., copies of a CAK, copies of a SAK) to multiple switches of the electric power distribution system to enable multiple secure communication links to be established with the IED. At least one of the secure communication links may be a backup secure communication link that enables the IED to continue to communicate data in the event that another of the secure communication links is unavailable. The IED may be able to use the same key (e.g., the same SAK) to communicate data with the different secure communication links.

For example, the controller may distribute a first copy of a key to a first switch to establish a first secure communication link between the first switch and the IED The controller may also distribute a second copy of the same key to a second switch to establish a second secure communication link between the second switch and the TED. One of the switches may also distribute a third copy of the same key to the IED to enable the IED to communicate data using the third copy of the key. During operation, the IED may communicate data with the first switch using the first secure communication link and the third copy of the key (e.g., to communicate data between the IED and another device of the electric power distribution system via the switch). That is, the first switch may use the first copy of the key to communicate data with the IED. At this time, the second secure communication link between the IED and the second switch may be inactive, and the IED may not communicate data with the second switch. However, an event may occur to cause the first secure communication link to become unavailable. Therefore, the IED and the first switch may not be able to communicate data with one another. In response, the second secure communication link may become active, and the IED may communicate data with the second switch instead of with the first switch. Indeed, the IED may use the same third copy of the key and the second switch may use the second copy of the key to communicate data with one another, and the IED may continue to transmit data to other devices of the electric power distribution system even though the first secure communication link is unavailable. As such, the controller may use or establish an SDN to distribute keys that enable continual communication of data.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

A communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with or having a certain set of characteristics or information) to a particular destination (e.g., an intended recipient) using instructions, such as rules, flows, matches, and actions, defined by the communications controller 180. In this manner, the switch 170 may automatically transmit data based on the instructions received from the communications controller 180 without having to be further modified (e.g., manually configured) or having to receive additional instructions from the communications controller 180. Therefore, the switch 170 may receive data to be subsequently transmitted, identify an instruction received from the communications controller 180 and relevant to the received data, and transmit the data to the intended recipient indicated by the instruction.

In some embodiments, the communications controller 180 may establish backup secure communication links for any of the IEDs 104, 106, 108, 115. For instance, the communications controller 180 may provide respective copies of the same key to different switches to establish respective secure communication links between the IEDs and the switches. By way of example, the communications controller 180 may establish a first secure communication link as a primary secure communication link to enable a first switch to communicate data with an IED using a first copy of a key. The communications controller 180 may also establish a second secure communication link as a backup secure communication link to enable a second switch to communicate data with the IED using a second copy of the same key. The IED and the first switch may be in communication one another via the first secure communication link (e.g., and not via the second secure communication link) while the first secure communication link is available to enable the IED to communicate with other devices of the electric power distribution system 100. In the event that the first secure communication link becomes unavailable or is prone to becoming unavailable, the IED and the second switch may be in communication with one another via the second secure communication link to enable the IED to continue to communicate with other devices of the electric power distribution system 100. Thus, the copies of the key distributed by the communications controller 180 may enable continual communication of data via a backup secure communication link when a primary secure communication link becomes unavailable.

Figure 2:
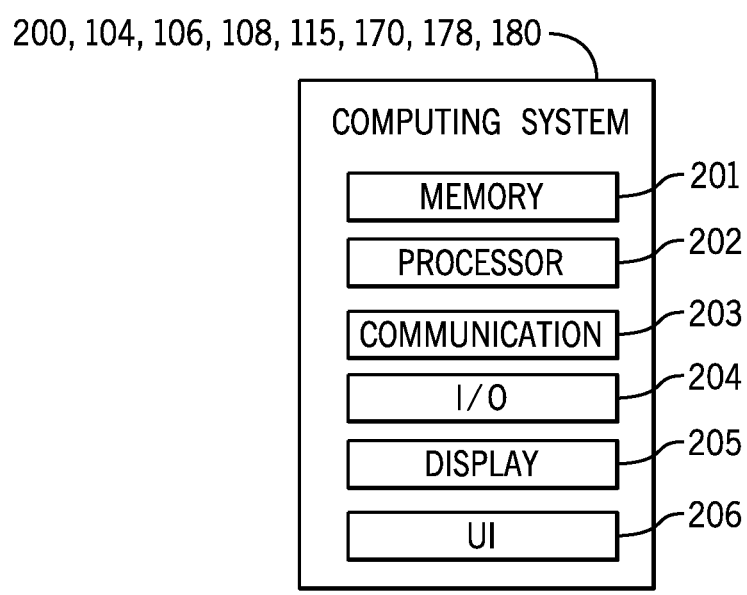
FIG. 2 is a schematic diagram of an embodiment of a computing system that may be incorporated in a device of an electric power distribution system, in accordance with an embodiment of the present disclosure.

FIG. 2 is a schematic diagram of an embodiment of a computing system 200 that may be incorporated within a device of the electric power distribution system 100, such as in any of the IEDs 104, 106, 108, 115, the switch 170, and/or the computing device 178. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via a MACsec communication link. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
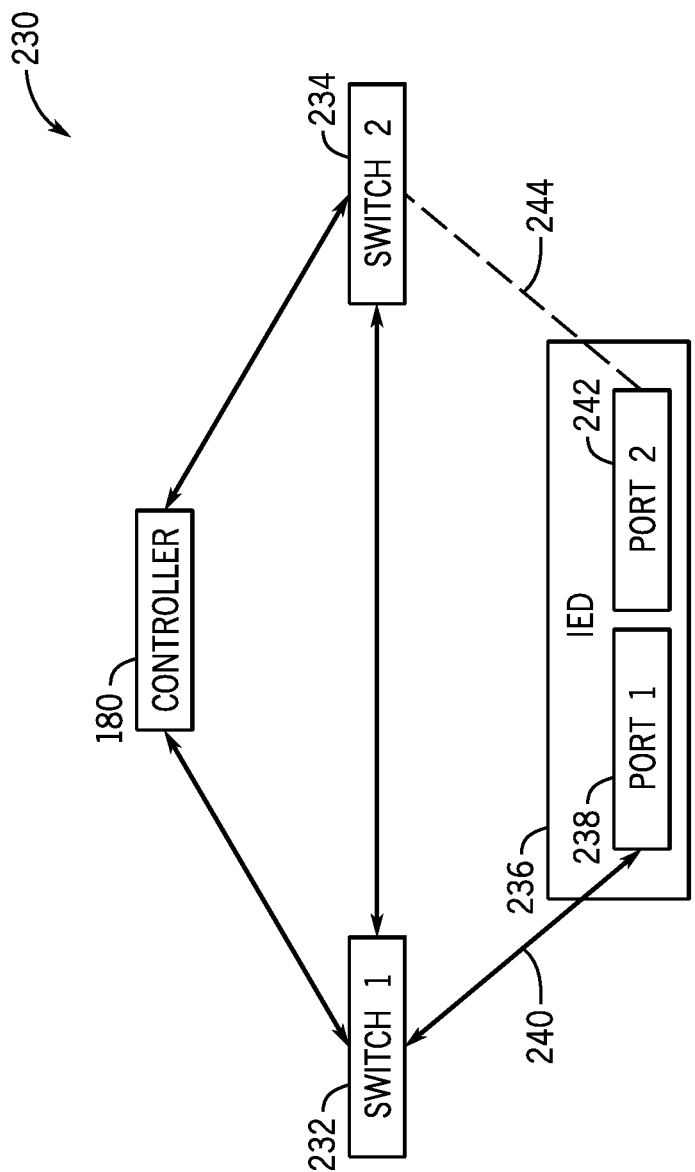
FIG. 3 is a schematic diagram of an embodiment of a communication network in which an intelligent electronic device (IED) is communicatively coupled to a first switch, in accordance with an embodiment of the present disclosure.

FIG. 3 is a schematic diagram of an embodiment of a communication network 230 of the electric power distribution system 100. The communication network 230 includes the communications controller 180, which may be communicatively coupled to a first switch 232 and a second switch 234. Each of the switches 232, 234 may also be communicatively coupled to an TED 236 (e.g., any of the IEDs 104, 106, 108, 115). For example, the first switch 232 may be communicatively coupled to a first port 238 of the IED 236 via a first secure communication link 240 (e.g., a first cable, a first MKA connectivity association, a first MACsec communication link), and the second switch 234 may be communicatively coupled to a second port 242 of the IED 236 via a second secure communication link 244 (e.g., a second cable, a second MKA connectivity association, a second MACsec communication link). The IED 236 may communicate with other devices of the electric power distribution system 100 via either of the switches 232, 234. For instance, the IED 236 may transmit data to one of the switches 232, 234, which then transmits the data to another device (e.g., an intended recipient) associated with the data. Additionally or alternatively, one of the switches 232, 234 may receive data (e.g., from another device of the electric power distribution system 100) and may transmit the data to the IED 236. Further still, the switches 232, 234 may be communicatively coupled to one another. As such, the switches 232, 234 may communicate data with one another, such as to transmit data between devices and/or to verify data received from the other switch 232, 234.

In certain embodiments, the communications controller 180 may establish an SDN by transmitting instructions (e.g., rules, flows, matches, actions) to the switches 232, 234. The switches 232, 234 may use the instructions to determine a manner in which received data is to be transmitted. For example, the switch 232 may receive data from the IED 236 via the first secure communication link 240, the switch 232 may use the instructions received from the communications controller 180 (e.g., based on a characteristic of the received data) to identify the intended recipient of the data, and the switch 232 may transmit the data accordingly. Thus, the switch 232 may automatically transmit data between devices of the electric power distribution system 100 based on the instructions received from the communications controller 180. Although the present disclosure primarily discusses use of an SDN in the electric power distribution system 100 to enable communication between devices, in additional or alternative embodiments of the electric power distribution system 100, the devices may communicate with one another without implementation of an SDN.

In some embodiments, the communications controller 180 may enable communication between the IED 236 and any of the switches 232, 234 via a respective MACsec communication link. To establish the MACsec communication links, the controller 180 may generate and distribute CAKs and/or SAKs to the switches 232, 234 (e.g., via respective representational state transfer application programming interfaces), and the switches 232, 234 may then distribute respective copies of the CAKs to the IED 236 via respective adoption links established with the IED 236. Based on a verified possession of the copies of the CAKs, the switches 232, 234 may establish a respective MKA connectivity association with the IED 236. The switches 232, 234 may distribute respective copies of the SAKs to the IED 236 via the respective MKA connectivity associations and then communicate data with the IED 236 using the SAKs, thereby establishing the secure communication links 240, 244 as MACsec communication links. The IED 236 may use the SAKs to communicate data via the MACsec communication links, such as to encrypt data to be transmitted to one of the switches 232, 234 (e.g., for subsequent transmission to another device) and/or to decrypt encrypted data received from one of the switches 232, 234 (e.g., data initially transmitted by another device). Although the present disclosure primarily discusses the use of MKA connectivity associations and MACsec communication links to communicate data, any other suitable communication techniques may be used to communicate data between devices of the electric power distribution system 100.

In the illustrated embodiment, the first secure communication link 240 may be a primary secure communication link, and the second secure communication link 244 may be a backup secure communication link. For example, while the first secure communication link 240 is available, the IED 236 may communicate data with the first switch 232 via the first secure communication link 240 to communicate with other devices of the electric power distribution system, and the IED 236 may not communicate data with the second switch 234 via the second secure communication link 244. By way of example, based on information associated with the communications network 230, such as information associated with the IED 236 and/or the communicative coupling between the switches 232, 234 and the respective ports 238, 242, the communications controller 180 may determine that the first switch 232 is the primary switch and the second switch 234 is the backup switch. Such information may include a serial number, an Internet Protocol address, a cryptographic identity, a source media access control address (e.g., indicative that the IED 236 is available to the first switch 232). As a result, the communications controller 180 may determine that the first secure communication link 240 is to be established as the primary secure communication link and the second secure communication link 244 is to be established as the backup secure communication link. To this end, the communications controller 180 may transmit respective CAKs to the switches 232, 234 to enable the switches 232, 234 to establish respective MKA connectivity associations with the IED 236. The communications controller 180 may additionally transmit a first copy of a SAK to the first switch 232 and a second copy of the same SAK to the second switch 234 to enable the switches 232, 234 to establish respective MACsec communication links with the IED 236.

The first switch 232 may then transmit a third copy of the same SAK to the IED 236 via its MKA connectivity association established with the IED 236, thereby establishing the first secure communication link 240 as a primary MACsec communication link. The IED 236 and the first switch 232 may then communicate with one another using their respective copies of the SAK while the first secure communication link 240 is available. Indeed, in the illustrated embodiment, the IED 236 may use the third copy of the SAK to encrypt data for transmission to the first switch 232 via the first secure communication link 240 and/or to decrypt encrypted data received from the first switch 232 via the first secure communication link 240. Additionally, the second switch 234 may establish the second secure communication link 244 as a backup MACsec communication link using its second copy of the SAK. However, the second switch 234 may not initially communicate with the IED 236 via the second secure communication link 244. Even though the second switch 234 and the IED 236 may have copies of the same SAK for establishing the second secure communication link 244 as the backup MACsec communication link, the second secure communication link 244 may remain inactive. Rather, the second switch 234 may cache or store the second copy of the SAK until the first secure communication link 240 becomes unavailable.

Figure 4:
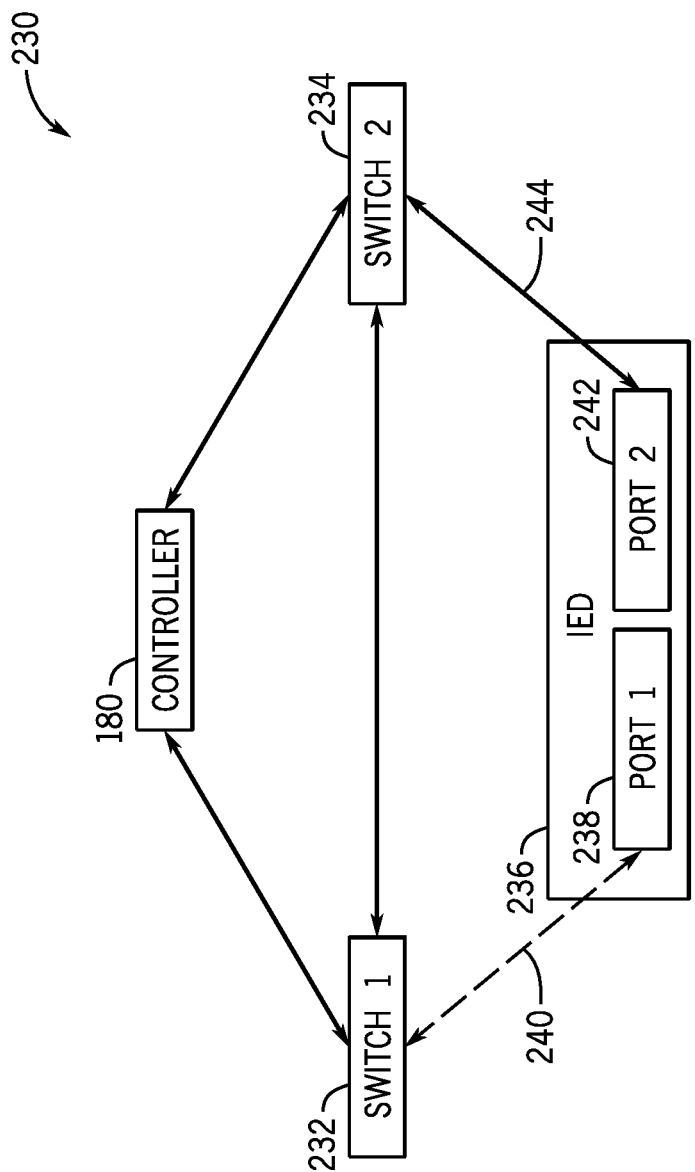
FIG. 4 is a schematic diagram of the communication network of FIG. 3 in which an IED is communicatively coupled to a second switch instead of to the first switch after occurrence of a failover event, in accordance with an embodiment of the present disclosure.

FIG. 4 is a schematic diagram of the communications network 230 after a failover event has occurred to cause the first secure communication link 240 to become inactive and the second secure communication link 244 to become active. That is, the IED 236 may communicate data with other devices via the second secure communication link 244 using the second port 242 instead of via the first secure communication link 240 using the first port 238 after the failover event. By way of example, the failover event may be caused by a fault of the first switch 232, a fault of the first port 238, or any other suitable event that may cause the first secure communication link 240 to become unavailable or prone to becoming unavailable for communicating data.

As a result, the IED 236 and the second switch 234 may use their respective copies of the same SAK to communicate via the second secure communication link 244. That is, the IED 236 may use the same third copy of the SAK to encrypt data for transmission to the second switch 234 via the second secure communication link 244 and/or to decrypt encrypted data received from the second switch 234 via the second secure communication link 244. Thus, the second secure communication link 244 becomes a new active secure communication link, and the second switch 234 becomes a new primary switch. In this way, the IED 236 may continue to communicate data to other devices via a MACsec communication link even while the first secure communication link 240 is unavailable.

In certain embodiments, after the second communication link 244 becomes active, the second switch 234 may initiate the MKA protocol to establish a new MKA connectivity association between the IED 236 and the second switch 234. For instance, the second switch 234 may distribute another CAK to the IED 236 to establish the new MKA connectivity association. Further, the second switch 234 may also establish a new MACsec communication link with the IED 236 to replace the previously established MACsec communication link. By way of example, after a threshold period of time (e.g., between 2 and 10 seconds, between 11 seconds and 30 seconds, more than 30 seconds), the second switch 234 may distribute a copy of a new SAK to the IED 236 via the newly established MKA connectivity association to establish the new MACsec communication link. Thereafter, the second switch 234 and the IED 236 may communicate data with one another via copies of the new SAK instead of via the second and third copies of the previous SAK, respectively. As such, after the failover event, the second switch 234 may use the cached SAK to communicate temporarily before establishment of a new MACsec communication link for communicating data with the IED 236.

In some embodiments, the IED 236 may continue to communicate data via the second secure communication link 244 even after the first secure communication link 240 has become available (e.g., after a maintenance operation has been performed). In other words, the second secure communication link 244 may become the new primary MACsec communication link for communicating data. The first secure communication link 240 may then become the new backup MACsec communication link, for example, after the first secure communication link 240 becomes available. To this end, the communications controller 180 may then identify the SAK (e.g., the new SAK) being used to communicate data via the second secure communication link 244 and generate a copy of the SAK. The communications controller 180 may distribute the copy of the SAK to the first switch 232 to establish the first secure communication link 240 as the new backup MACsec communication link. Therefore, upon occurrence of an additional failover event in which the second secure communication link 244 becomes unavailable, the IED 236 may then communicate data via the first secure communication link 240.

In additional or alternative embodiments, the IED 236 may switch to communicating data via the first secure communication link 240 after the first secure communication link 240 has become available and before the second secure communication link 244 becomes unavailable (e.g., after occurrence of an additional failover event). That is, the first secure communication link 240 may become the primary MACsec communication link again instead of the new backup MACsec communication link, and the second secure communication link 244 may revert to the backup MACsec communication link instead of the new primary MACsec communication link once the first secure communication link 240 becomes available. For instance, the IED 236 may communicate via the first secure communication link 240 instead of via the second secure communication link 244 based on a monitored period of time after the first secure communication link 240 has become available exceeding a threshold period of time, in response to a user input indicative of a request to communicate via the first secure communication link 240, and/or in response to another indication that the first switch 232 is to become the primary switch.

In further embodiments, the primary switch may continually update the SAK being used to communicate data with the IED 236, such as at a certain time frequency and/or based on an amount of data being transmitted. The communications controller 180 may determine when a new SAK has been generated and, in response, generate a copy of the new SAK and distribute the copy of the new SAK to the backup switch. In this way, the backup switch may cache the most updated SAK and readily enable communication with the IED 236 after a failover event.

It should be noted that in some embodiments, the first switch 232 may generate the SAK for distribution to the first switch 232 without having to receive the SAK from the communications controller 180. That is, the communications controller 180 may not generate the SAK for distribution to the first switch 232. In such embodiments, the first switch 232 may generate a first copy of the SAK and a second copy of the SAK. The first switch 232 may distribute the second copy of the SAK to the IED 236 for establishing the primary MACsec communication link with the IED 236, and the first switch 232 may use the first copy of the SAK to encrypt and/or decrypt information transmitted via the primary MACsec communication link. The first switch 232 may also generate a third copy of the SAK and distribute the third copy of the SAK to the communications controller 180. The communications controller 180 may then distribute the third copy of the SAK to the second switch 234. Additionally or alternatively, the first switch 232 may directly distribute the third copy of the SAK to the second switch 234. The second switch 234 may then establish the backup MACsec communication link with the IED 236 via the third copy of the SAK. In this way, each of the first switch 232 and the second switch 234 may possess respective copies of the same SAK. Thus, during a failover event in which communication between the IED 236 and the first switch 232 is unavailable, the IED 236 may use its second copy of the SAK to communicate with the second switch 234 via the backup MACsec communication link.

Although the illustrated communication network 230 includes the first switch 232 and the second switch 234 communicatively coupled to the IED 236, the first switch 232 and/or the second switch 234 may be communicatively coupled to multiple other devices of the electric power distribution system, such as to other IEDs. By way of example, the first switch 232 may be the primary switch and/or the backup switch to other IEDs, and/or the second switch 234 may be the primary switch and/or the backup switch to other IEDs In further embodiments, additional switches may be communicatively coupled to the IED 236.

In one example, there may be multiple backup switches that may enable the IED 236 to continue to communicate data in the event of multiple failover events occurring. In another example, the IED 236 may use multiple primary switches to communicate data (e.g., to communicate data with different devices that may be separately coupled to respective primary switches), and the IED 236 may also be communicatively coupled to multiple switches to backup each of the primary switches.

Each of FIGS. 5 and 6 discussed below illustrates a method associated with communicating data with respect to a failover event. In some embodiments, each of the methods may be performed by a single respective component or system, such as by the computing system 200 (e.g., the processor 202). In additional or alternative embodiments, multiple components or systems may perform the procedures for a single one of the methods. Each method is described with respect to the devices of the communication network 230. However, each method may be performed with respect to any suitable devices of the communication network 230. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 5:
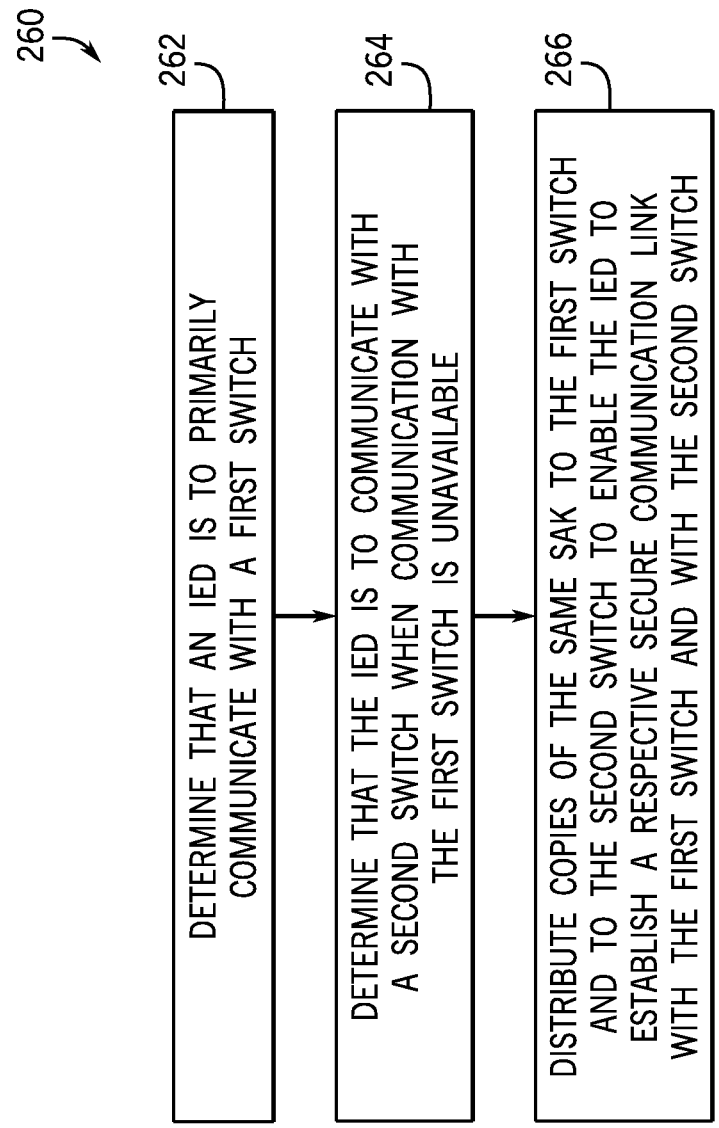
FIG. 5 is a flowchart of an embodiment of a method for enabling devices of an electric power distribution system to establish secure communication links in the event of a failover event, in accordance with an embodiment of the present disclosure.

FIG. 5 is a flowchart of an embodiment of a method 260 for enabling devices of the electric power distribution system 100 to establish secure communication links during a failover event. The method 260 is described from the perspective of the communications controller 180. However, a method similar to the method 260 may be performed by any other device of the electric power distribution system 100. Further, the method 260 may be performed after initial communication links (e.g., adoption links) have been established between the IED 236 and the switches 232, 234. At block 262, the communications controller 180 may determine that the IED 236 is to primarily communicate via the first switch 232. That is, the communications controller 180 may determine that the first switch 232 is the primary switch and that the first secure communication link 240 is the primary secure communication link. At block 264, the communications controller 180 may determine that the IED 236 is to communicate via the second switch 234 in response to identifying an indication of unavailability of the communication between the IED 236 and the first switch 232 (e.g., the communication is unavailable, may be come unavailable, or is prone to becoming unavailable). In other words, the communications controller 180 may determine that the second switch 234 is the backup switch with respect to the first switch 232 and the second secure communication link 244 is the backup secure communication link with respect to the first secure communication link 240. Thus, the communications controller 180 may determine that the IED 236 is to communicate via the second secure communication link 244 upon occurrence of a failover event in which the first secure communication link 240 between the IED 236 and the first switch 232 is unavailable or may become unavailable.

In certain embodiments, the communications controller 180 may establish such a determination based on information associated with the switches 232, 234 and/or the IED 236. For example, the communications controller 180 may determine that the IED 236 may primarily communicate via the first port 238, and the communications controller 180 may determine that the first switch 232 is communicatively coupled to the first port 238 and is therefore the primary switch. Further, the communications controller 180 may determine that the second port 242 of the IED 236 is to be used upon occurrence of a failover event associated with the first port 238, and the communications controller 180 may determine that the second switch 234 is communicatively coupled to the second port 242 and is therefore the backup switch with respect to the first switch 232.

At block 266, in response to determining that the first switch 232 is the primary switch and the second switch 234 is the backup switch, the communications controller 180 may distribute copies of the same SAK to the first switch 232 and to the second switch 234. As a result, the first switch 232 may establish the first secure communication link 240 as a first MACsec communication link with the IED 246 via a first copy of the SAK, and the second switch 234 may establish the second secure communication link 244 as a second MACsec communication link with the IED 246 via a second copy of the same SAK. The IED 236 may receive a third copy of the same SAK (e.g., generated and distributed by the first switch 232) and use the copy of the SAK to communicate via the first switch 232. The IED 236 may also immediately be able use the same third copy of the SAK to communicate via the second switch 234 if the communication with the first switch 232 becomes unavailable. Indeed, the IED 236 may use the third copy of the SAK to communicate via the second switch 234 without first having to receive a new key (e.g., a newly generated SAK) and establish a new communication link (e.g., a new MACsec communication link) with the second switch 234. Accordingly, a possible downtime in which the IED 236 is not able to communicate data may be reduced.

In embodiments in which the first switch 232 generates the SAK for establishment of the first MACsec communication link with the IED 246, the communications controller 180 may receive a copy of the generated SAK from the first switch 232 upon determining that first switch 232 is the primary switch and the second switch 234 is the backup switch. In response to receiving the copy of the SAK, the communications controller 180 may distribute the copy of the SAK to the second switch 234. As such, the communications controller 180 enables each of the switches 232, 234 to possess copies of the same SAK, thereby enabling the IED 236 to use a corresponding copy of the same SAK during a failover event in which the communication with the first switch 232 becomes unavailable.

The communications controller 180 may perform the procedures of the method 260 at different times during operation of the electric power distribution system 100. As an example, the communications controller 180 may perform the method 260 at a predetermined frequency and/or at predetermined time stamps to confirm identification of the primary switch and the backup switch. As another example, the communications controller 180 may determine an occurrence of a failover event, which may cause a different switch to become the primary switch and/or a different switch to become the backup switch. Thus, in response to a determination that a failover event has occurred, the communications controller 180 may identify the new primary switch and/or the new backup switch. As a further example, the communications controller 180 may determine that a primary switch is using a new SAK to communicate with the IED 236. In response, the communications controller 180 may distribute a copy of the new SAK to the backup switch, thereby updating the SAK being used for establishing the MACsec communication link between the backup switch and the IED 236.

Figure 6:
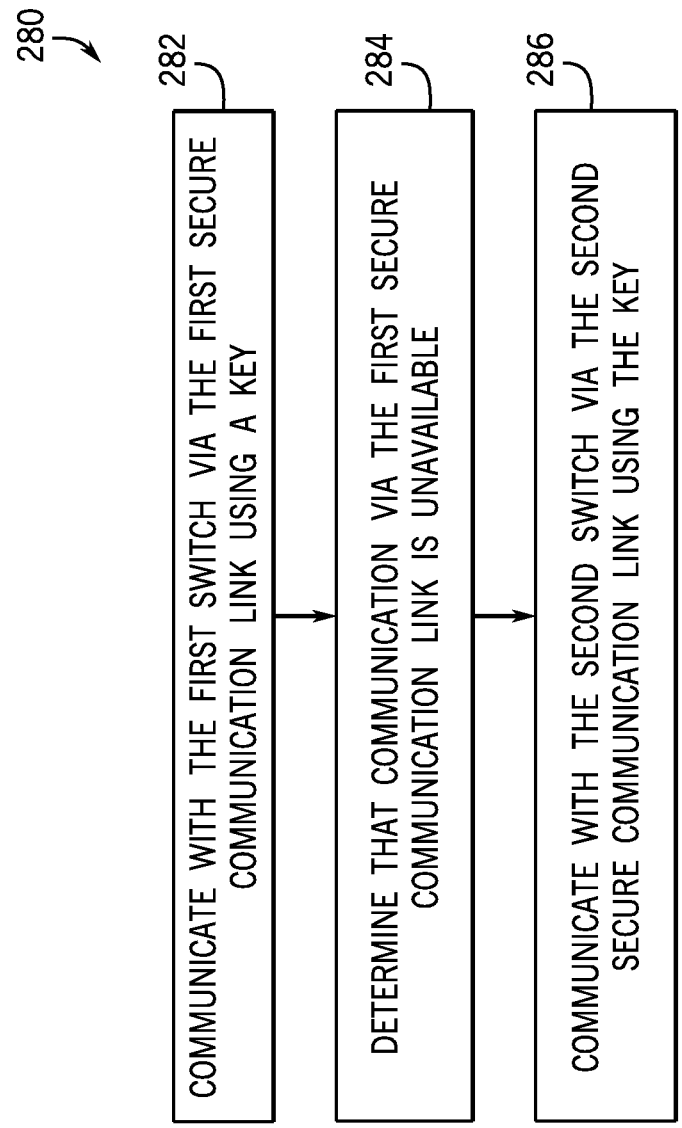
FIG. 6 is a flowchart of an embodiment of a method for communicating data after an occurrence of a failover event, in accordance with an embodiment of the present disclosure.

FIG. 6 is a flowchart of an embodiment of a method 280 for communicating data after an occurrence of a failover event. The method 280 is described from the perspective of the IED 236. However, a method similar to the method 280 may be performed by any other device of the electric power distribution system 100. Further, the method 280 may be performed after respective MACsec communication links have been established between the IED 236 and the switches 232, 234 (e.g., after initial performance of the method 260 to establish the primary secure communication link and the backup secure communication link). At block 282, the IED 236 may communicate data with the first switch 232 via the first secure communication link 240 using a copy of a SAK. By way of example, the communications controller 180 may have generated the SAK and distributed the SAK to the first switch 232 (e.g., as described with respect to the block 266 of the method 260). The first switch 232 may then generate the copy of the SAK and distribute the copy of the SAK to the IED 236 to establish the first secure communication link 240 as a MACsec communication link that enables the IED 236 to communicate data with the first switch 232 via its copy of the SAK. For instance, the first switch 232 may use its copy of the SAK to encrypt data to be transmitted to the first switch 232 (e.g., for subsequent transmission to other devices) and/or to decrypt encrypted data received from the first switch 232 (e.g., data initially transmitted by another device). As such, the first secure communication link 240 may be an active secure communication link.

At this time, the second secure communication link 240 may be an inactive secure communication link. That is, even though the second switch 234 may possess another copy of the same SAK being used to communicate via the first secure communication link 240 and the second switch 234 may have established the second secure communication link 244 as another MACsec communication link with the IED 236, the IED 236 may not communicate data via the second secure communication link 240. In other words, the IED 236 may not communicate data with the second switch 234 while communication with the first switch 232 is available.

At block 284, the IED 236 may determine that the first secure communication link 240 is unavailable or is prone to becoming unavailable. For example, the IED 236 may determine that the first switch 232 is faulty and/or the port (e.g., the first port 238) used for communicating via the first switch 232 is faulty. Therefore, the IED 236 may not be able to communicate via the first switch 232.

At block 286, in response to determining that communication via the first secure communication link 240 is unavailable or is prone to becoming unavailable, the IED 236 may use the same copy of the SAK to communicate via the second switch 234 via the second secure communication link 244. In this way, the second secure communication link 244, which was previously inactive when the first secure communication link 240 was available, is now a new active communication link. Thus, the IED 236 may continue to communicate data after the first secure communication link 240 is unavailable by using its copy of the SAK. Indeed, after the first secure communication link 240 becomes unavailable, the IED 236 may be able to communicate data with the second switch 234 without having to first establish an additional secure communication link (e.g., an additional MACsec communication link) with the second switch 234, thereby reducing a possible downtime in which communication of data may be unavailable.

In some embodiments, after the IED 236 has switched to communicating via the second switch 234 using the second secure communication link 244, the second switch 234 may update the second secure communication link 244. For instance, the second switch 234 may generate and distribute a new CAK and/or a new SAK to establish a new MKA connectivity association and/or a new MACsec communication link with the IED 236. In this manner, the IED 236 may use the new SAK to communicate data via the second secure communication link 244.

The IED 236 may continue to perform similar procedures described with respect to the method 280 after switching to communicating via the second switch 234. For example, in certain embodiments, the IED 236 may continue to communicate via the second switch 234 using the second secure communication link 244 even after the first secure communication link 240 has become available. That is, after the first secure communication link 240 has become available, the second secure communication link 244 may remain active and the first secure communication link 240 may become a new inactive secure communication link for backup to the second secure communication link 244. In such embodiments, the IED 236 may communicate via the second switch 234 until the second secure communication link 244 is unavailable. Upon determining that the second secure communication link 244 is unavailable, the IED 236 may then use its SAK to communicate via the first switch 232 using the first secure communication link 240 again.

In additional or alternative embodiments, the IED 236 may revert back to communicating via the first switch 232 using the first secure communication link 240 after the first secure communication link 240 has become available. That is, after the first secure communication link 240 has become available, the first communication link 240 may become the active secure communication link, and the second secure communication link 244 may become the inactive secure communication link again for backup to the first secure communication link 240. Thus, the IED 236 may communicate via the first switch 232 again until the first secure communication link 240 is unavailable. Upon determining that the first secure communication link 240 is unavailable, the IED 236 may then use its SAK to communicate via the second switch 234 using the second secure communication link 240 again.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An electric power distribution system, comprising:
   a first switch configured to generate a first secure association key (SAK) to establish a first media access security (MACsec) communication link with an intelligent electronic device (IED) via a first port of the IED;
   a second switch configured to establish a second MACsec communication link with the IED via a second port of the IED; and
   a controller configured to perform operations comprising:
      determining that the first switch is a primary switch;
      determining that the second switch is a backup switch to the first switch;
      upon determining that the first switch is the primary switch and the second switch is the backup switch, receiving a copy of the SAK from the first switch; and
      in response to receiving the copy of the SAK, distributing the copy of the SAK to the second switch to enable the second switch to establish the second MACsec communication link as an inactive secure communication link with the IED via the second port of the IED.

2. The electric power distribution system of claim 1, wherein the first switch is configured to establish a first MACsec key agreement (MKA) connectivity association with the IED, and the second switch is configured to establish a second MKA connectivity association with the IED.

3. The electric power distribution system of claim 2, wherein the first switch is configured to distribute an additional copy of the SAK to the IED via the first MKA connectivity association to establish the first MACsec communication link with the IED; and
   communicating data with the IED via the first MACsec communication link using the SAK.

4. The electric power distribution system of claim 1, wherein the first switch is configured to use the SAK to encrypt data to be transmitted to the IED via the first MACsec communication link, decrypt encrypted data received from the IED via the first MACsec communication link, or both.

5. The electric power distribution system of claim 1, wherein the second switch does not communicate data with the IED via the second MACsec communication link while the first MACsec communication link is the active secure communication link.

6. The electric power distribution system of claim 1, wherein the second switch is configured to communicate data with the IED via the second MACsec communication link using the copy of the SAK in response to the first MACsec communication link becoming unavailable, such that the second MACsec communication link is a new active secure communication link.

7. The electric power distribution system of claim 6, wherein the second switch is configured to perform operations comprising:

distributing a copy of a new SAK to the IED via the second MACsec communication link within a threshold period of time after the first MACsec communication link becomes unavailable;

using the new SAK to establish a third MACsec communication link that replaces the second MACsec communication link; and communicating data with the IED via the third MACsec communication link using the new SAK.

* * * * *